United States Patent [19]

Cole

[11] Patent Number: 5,078,250

[45] Date of Patent: Jan. 7, 1992

[54] UNIVERSAL SAFETY GUARD ASSEMBLY FOR A CONVEYOR

[75] Inventor: Barry A. Cole, Colechester, Conn.

[73] Assignee: Sinco, Inc., East Hampton, Conn.

[21] Appl. No.: 638,204

[22] Filed: Jan. 7, 1991

[51] Int. Cl.⁵ .............................................. B65G 13/00
[52] U.S. Cl. .............................. 193/35 R; 198/860.3; 198/861.1
[58] Field of Search .............. 198/860.3, 861.1, 860.1; 193/35 R

[56] References Cited

U.S. PATENT DOCUMENTS

| | | | |
|---|---|---|---|
| 2,922,512 | 1/1960 | Presti | 198/861.1 X |
| 3,263,951 | 8/1966 | Stokes | 198/861.1 X |
| 4,981,225 | 1/1991 | Cole | 211/183 |

FOREIGN PATENT DOCUMENTS

| | | | |
|---|---|---|---|
| 1914462 | 9/1970 | Fed. Rep. of Germany | 198/861.1 |
| 0762491 | 11/1956 | United Kingdom | 198/861.1 |

OTHER PUBLICATIONS

Sinco Flexguard Publication, Sinco Products, Inc., 1989 (8pp).

Primary Examiner—Joseph E. Valenza
Assistant Examiner—Cheryl L. Gastineau
Attorney, Agent, or Firm—Chilton, Alix & Van Kirk

[57] ABSTRACT

An adjustable safety guard assembly for a conveyor. The conveyor guard has frame modules which can be adapted to guard conveyors having a variety of configurations. The frame modules are mounted adjacent a conveyor, and are linked together by cables from which guard nets are suspended.

24 Claims, 3 Drawing Sheets

UNIVERSAL SAFETY GUARD ASSEMBLY FOR A CONVEYOR

BACKGROUND OF THE INVENTION

The present invention is directed toward a universally adjustable conveyor safety guard for preventing materials from falling from a conveyor and catching materials which fall. More particularly, this invention relates to a conveyor safety guard which can be adapted to fit conveyor systems having a wide range of configurations.

Conveyors are used to handle and transport products in a variety of industries. Overhead conveyors move materials while allowing other labor activities to take place on the floor space below. Multi-tiered conveyors and parallel conveyors can be arranged to occupy minimal floor space. Many conveyors are floor mounted, or are hung from ceiling members. Conveyors vary in width depending on usage and the type of product being conveyed.

Various problems can arise with the movement of materials on a conveyor. The product being conveyed can break or the packaging can separate and allow individual small parts of the product to clog the conveyor system. Parts of the conveyor itself can break off or jumpout of place, particularly "pop out" rollers, which often jettison out of place during conveyor jams. Sometimes an entire carton will strike one of the conveyor supports and fall from the conveyor. Furthermore, a box or carton can get jammed on a conveyor (with the conveyor still running), causing the product to build up. Eventually, material can stack on top of the jammed product, thereby causing the moving product to fall off the sides of the conveyor. This can pose a serious danger to personnel, particularly when a conveyor is overhead. Furthermore, the fallen product often is damaged and therefore cannot be used.

Typically manufacturers provide nominal "guard rails" for conveyors. However, these rails serve little purpose in preventing the events mentioned above. They serve as guides to keep the product somewhat centered on the conveyor, but do nothing to prevent conveyor parts or broken products from falling from the conveyor. They generally do not prevent and in fact sometimes cause, the stacking effect which occurs when moving material piles up behind stalled product.

Conventionally, conveyor guards which employ safety nets positioned along the sides and below the conveyor have been custom installed for the size, shape and safety requirements of a particular conveyor system. A conveyor guard is usually either mounted on a custom fabricated support system, or is mounted on existing hangers or floor supports which may have not been specifically designed to support a conveyor guard. While these configurations may be suitable for certain applications, they customarily offer little, if any, offset for clearance between the conveyor and guard where product can be free of the conveyor and caught in the guard system.

Construction of custom-designed conveyors guards can be costly, especially when a conveyor system includes conveyors of varying size and shape. Furthermore, when the conveyor system is subsequently modified or the type of product conveyed is changed, it may be necessary to redesign or replace portions of the guard, resulting in additional expense.

SUMMARY OF THE INVENTION

Briefly stated, the present invention in a preferred form is directed toward a universally adjustable support system for a conveyor guard. The support system comprises a plurality of frame modules. Each frame module includes a support arm fastened to a support strut. The relative position of the support arm and support strut can be adjusted.

Each support arm comprises at least two longitudinally positioned, slidably intersecting support arm members. The length of a support arm is adjustable, and is determined by the relative position of the support arm members. Each support strut includes at least two longitudinally positioned, slidably intersecting support strut members. The relative position of the support strut members can be adjusted to obtain a support strut of the desired length.

The support strut can be slidably mounted to the support arm by a sleeve which is fixed to the end of the support arm. The support strut can be fastened at a variety of positions relative to the sleeve.

Preferably, each of the frame modules is H-shaped, and comprises two support struts fastened to one support arm. The frame modules are mounted adjacent the conveyor in any manner suitable to support a safety net, or other type of guard that is adapted to catch product which falls off of the conveyor or to prevent product from falling. H-shaped frame modules are preferably used, and are mounted such that the support struts are located on opposite sides of the conveyor, and the support arm extends beneath the conveyor in a direction perpendicular to the direction of movement of the conveyor. The frame modules are usually attached to the side rails of the conveyor. However, they can be attached at any other appropriate location, such as on horizontal beams ancillary to the conveyor, or to a wall, ceiling or floor.

The distance from each support strut to the conveyor is adjustable. The support arms of the frame modules are preferably clamped to the side rails of the conveyor, with the conveyor side rail sandwiched between the clamp and the support arm. The clamps can be fastened by bolts which are receivable in apertures aligned in the clamp and the support arm. Alternatively, the support arms can be fastened to the side rails directly with bolts or screws.

Preferably, the support arm members have spaced apertures aligned on opposite sides along their length, and are fixed to one another using bolts receivable in the apertures. The support strut members forming a support strut may also be attached in a similar manner.

An advantage of this invention is that frame pieces of varying sizes and shapes can be made using a few types of support arm members and support strut members having standard sizes.

In one embodiment of the invention, one or more cables are suspended from the frame modules and extend parallel to each other along the path of the conveyor. The cables preferably extend along the top and along the bottom of each of the support struts in the direction of movement of the conveyor.

Another embodiment of the present invention is a conveyor guard comprising a plurality of frame modules and a net mounted on cables suspended from the frame modules. The net is preferably attached to the cable using hooks. Nets of different sizes can be fastened to one another in a "patchwork" arrangement in order to form a guard of the desired size and shape for a specific conveyor.

When guard nets are desired below a conveyor and on both sides of the conveyor, four cables can be used, and can be extended along the top and bottom of the support struts of H-shaped frame modules. Netting can then be fastened between pairs of cables.

Yet another embodiment of the invention is a conveyor guard adapted for a branched conveyor. Netting is mounted along the outer sides of the branched conveyor system, and along the inner sides of each branch of the conveyor beginning adjacent to the branch. Separate frame modules can be mounted along each branch of the system.

When mounted on the conveyor, the frame modules can be arranged to position the net at a variety of distances away from the conveyor and at a variety of heights. The netting can be placed proximate the conveyor when it is desirable to prevent materials from falling from the conveyor. Alternatively, the netting can be spaced away from the conveyor far enough to allow objects to fall, thus preventing objects from stacking up when the conveyor system becomes clogged. The distance of the net from the conveyor and the height of the net can vary along the length of the conveyor as required. Furthermore, when a conveyor has a curve, the frame pieces can be adapted to fit the net around the curve, providing extra width when an object which is wider than the conveyor moves around the curve.

An object of this invention is to provide a new and improved conveyor safety guard which is adaptable for use with conveyors of different sizes, shapes and loads.

Another object of the invention is to provide an adjustable conveyor safety guard which is made from components having standard sizes.

Yet another object of the invention is to provide an adjustable conveyor guard which can be attached directly to a conveyor and can effectively accommodate the path of a branched or curved conveyor.

Other advantages and objects of the invention will become apparent from the specification and the drawings.

DETAILED DESCRIPTION OF THE INVENTION

Figure 1:
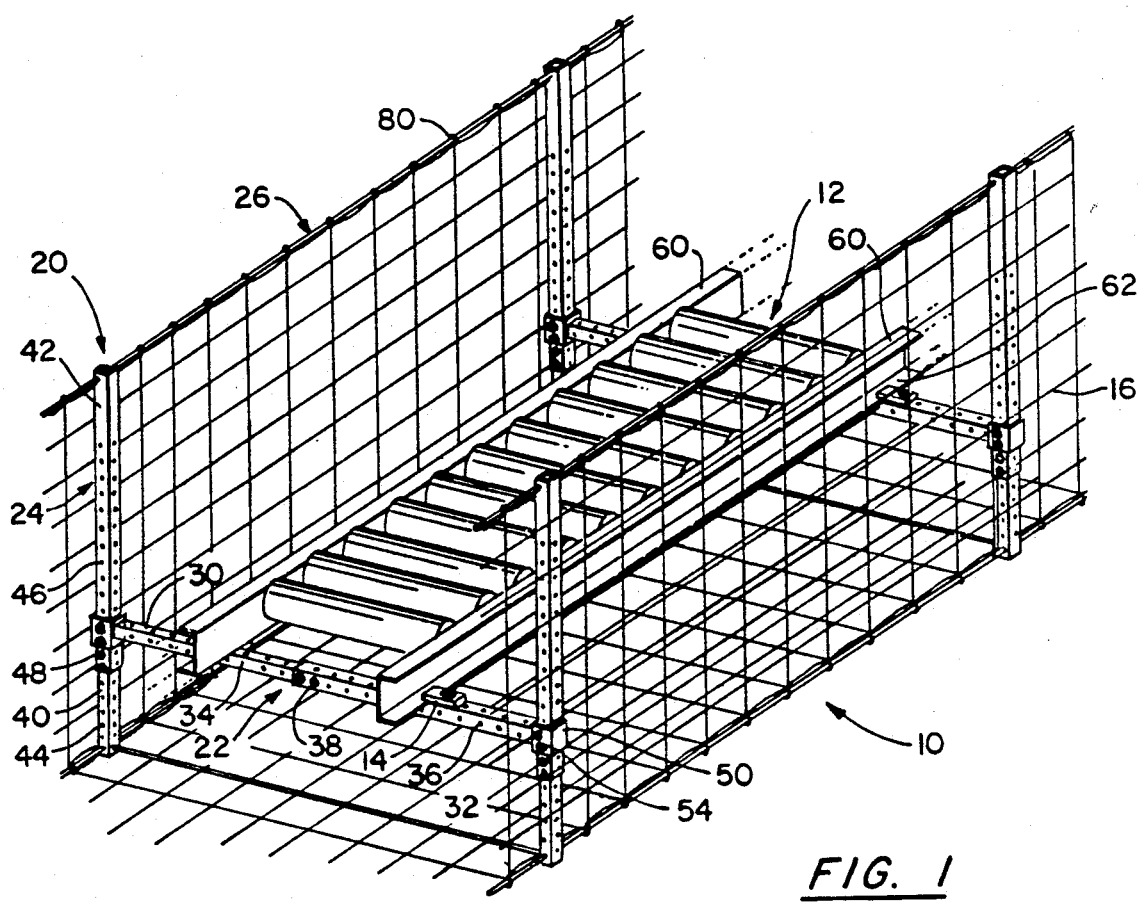
FIG. 1 is a fragmentary perspective view of an adjustable conveyor safety guard installed on a conveyor in accordance with the present invention.

With reference to the drawings wherein like numerals represent like parts throughout the figures, an adjustable safety guard assembly for a conveyor is designated generally by the numeral 10 in FIG. 1. The assembly 10 is fastened to conveyor 12 using clamps 14. The safety guard assembly 10 includes a net 16, which functions as a safety barrier for preventing materials from falling off of the conveyor and for catching materials which fall. The assembly 10 is adjustable to fit conveyors having a variety of different configurations. The height, width and length of the safety guard assembly, as well as the distance of the conveyor from the safety net, can be adjusted along a conveyor path. The conveyor guard can be made of components of a few standard sizes, which can be combined to make a conveyor guard system adapted to a specific conveyor. Accordingly, assembly 10 is intended to be illustrative of numerous forms and types of conveyor guards, and may assume numerous configurations other than those specifically illustrated.

The safety guard assembly 10 has a plurality of H-shaped frame modules 20, each of which comprises a support arm 22 and two support struts 24. Support arm 22 comprises two slidably intersecting support arm members 30 and 32 made of square tubular steel. Support struts 24 each comprises two square tubular steel slidably intersecting support strut members 40 and 42.

Figure 2:
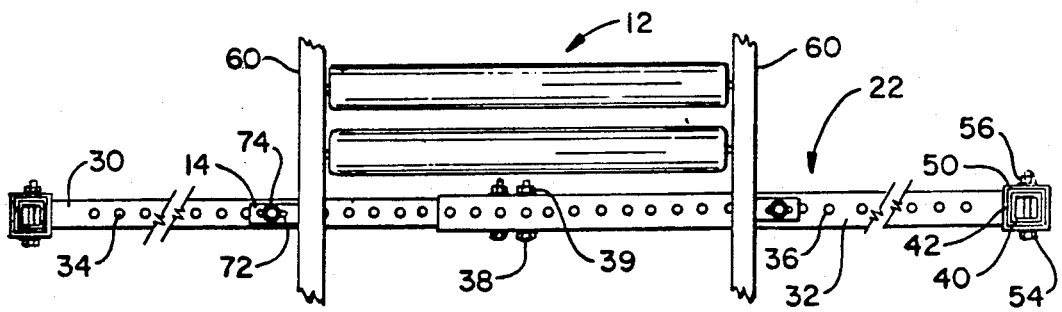
FIG. 2 is an enlarged, fragmentary top plan view, partly broken away, showing a support arm of FIG. 1.
Figure 3:
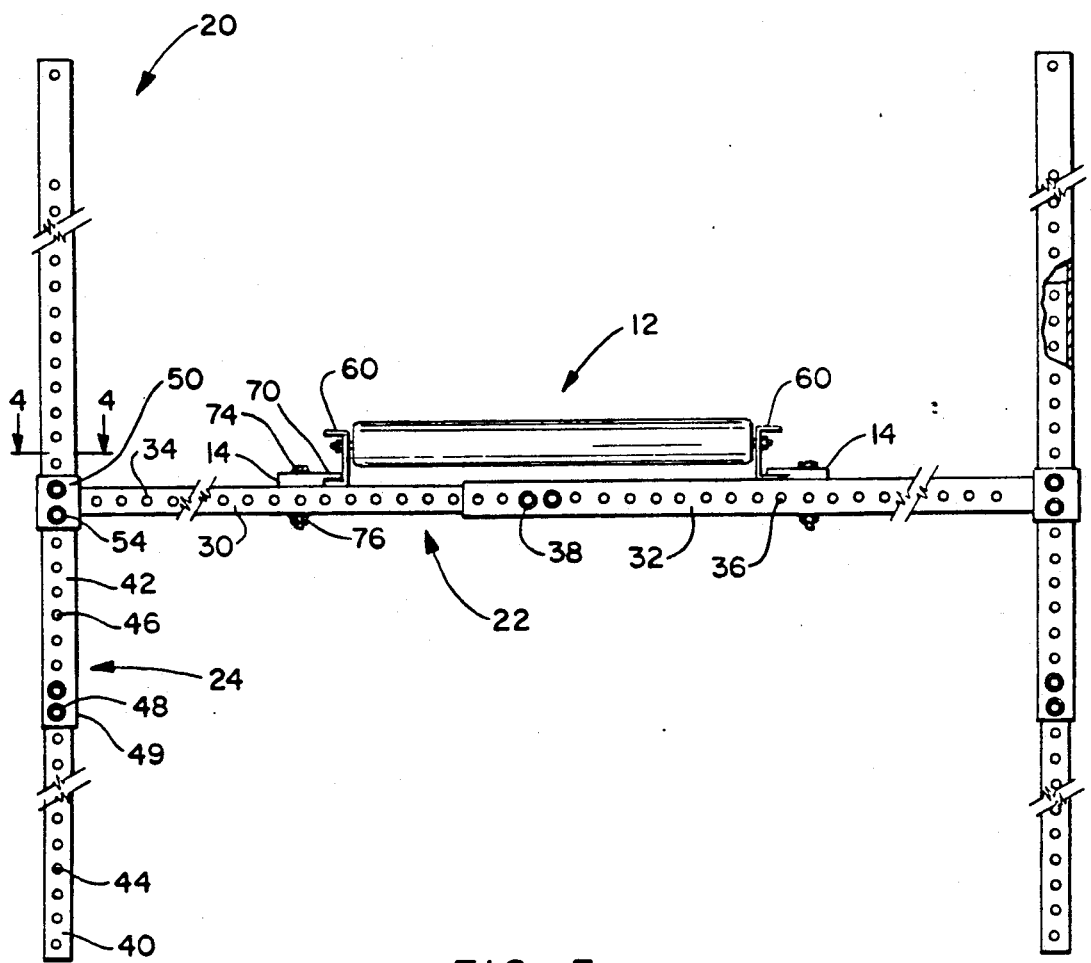
FIG. 3 is an enlarged, fragmentary end view, partly broken away, of a frame module according the invention.

Support arm members 30 and 32 each have a linear series of uniformly spaced apertures 34 and 36. The apertures 34 and 36 extend along all four sides of support arm members 30 and 32, and are superposed on opposite sides. The adjustable length of support arm 22 can be set at a desired length by inserting bolts 38 through selected pairs of apertures along the intersecting portion of support arm members 30 and 32, and fastening bolts 38 with nuts 39, as shown in FIG. 2.

Support strut members 40 and 42 each have a linear series of uniformly spaced apertures 44 and 46. The apertures 44 and 46 extend along all four sides of support strut members 40 and 42, and are superposed on opposite sides. The adjustable length of each support strut 24 can be set at a desired length by inserting bolts 48 through selected apertures of the intersecting portion of support strut members 40 and 42, and fastening bolts 48 with nuts 49.

Figure 4:
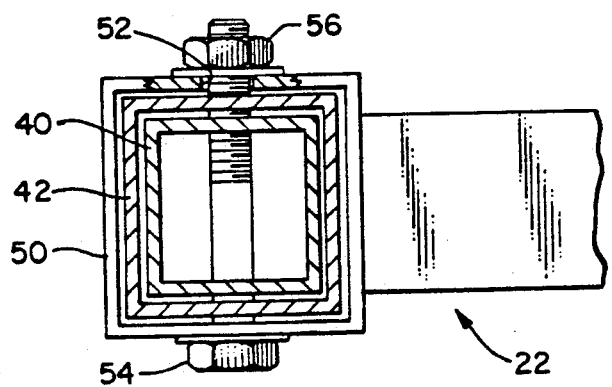
FIG. 4 is an enlarged fragmentary sectional view, taken along the lines 4—4 of FIG. 3, showing the attachment of a support arm to a support strut.

A sleeve 50, which has apertures 52 superposed on two opposite sides, as shown in FIG. 4, is fixedly attached to each of the opposing ends of the support arm 22. The sleeves 50 can be welded in position on support arm 22. Each sleeve 50 is oriented and dimensioned to slidably receive a support strut 24 so that the strut 24 is disposed in a perpendicular relationship to the support arm. The relative position of sleeve 50 (support arm 22) and support strut 24 is adjustable, and is set as desired by inserting bolts 54 through apertures 44, 46 and 52 and fastening bolts 54 with nuts 56.

Conveyor 12 has a pair of parallel side rails 60 having lower flanges 62. Each clamp 14 has a stepped clamp plate 70 having an aperture 72, as shown in FIG. 2. Plate 70 is dimensioned to cooperate with support arm 22 to sandwich lower flange 62 of side rail 60. Bolts 74 are receivable in apertures 72 and 34 and apertures 72 and 36, and are fastened by nuts 76.

As illustrated in FIG. 1, the frame modules 20 are linked to each other by tightly strung cables 26. Cables 26 are suspended horizontally in the direction of movement of the conveyor, along each of the two upper and two lower ends of support struts 24. Cables 26 pass through apertures 44 and 46, and are fastened by conventional means at the starting and ending points of the conveyor guard (not illustrated). Net 28 is fastened to cables 26 by hooks 80. In the preferred embodiment, net 28 forms a three sided, cage-like enclosure having an open top which enclosure surrounds the conveyor along its longitudinal extent.

Figure 5:
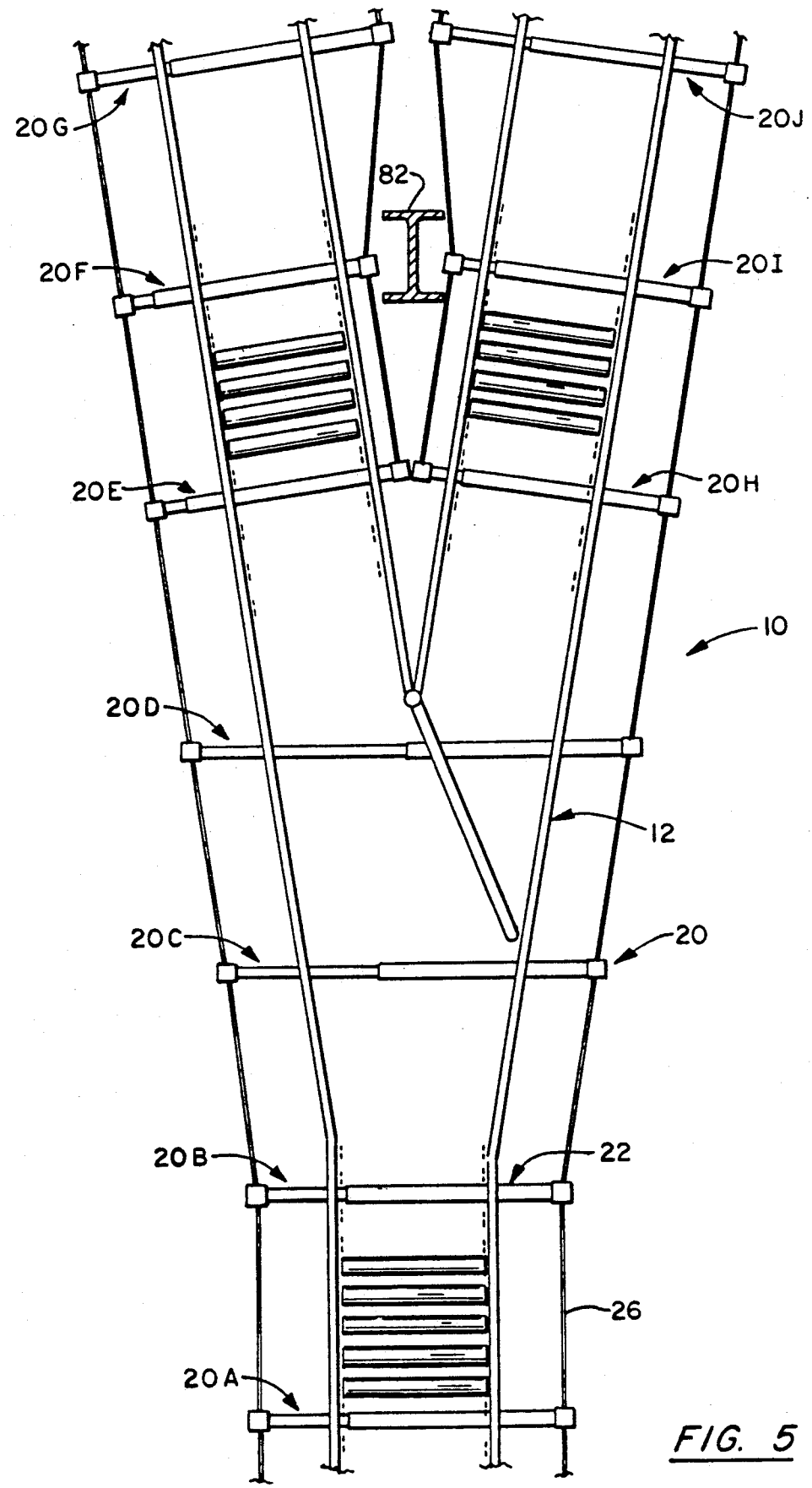
FIG. 5 is a fragmentary top plan view, partly in schematic with portions being omitted, of a conveyor safety guard installed on a branched embodiment of a conveyor system.

FIG. 5 illustrates the versatility of the conveyor guard system. The adjustable conveyor guard system is adapted for a conveyor having a Y-shaped junction. The conveyor guard system is also adjusted to avoid column 82. Separate frame modules 20E-20J are mounted along each branch of the conveyor and individually adjusted as required for the illustrated application.

In one example of the embodiment illustrated in FIGS. 1-5, frame module 20 is made of 16 gauge square tube galvanized steel. Support strut members 40 and 42 have the dimensions 1 in. ×1 in. ×28¼ in., and 1¼ in. ×1¼ in. ×28¼ in., respectively. Support arm members 30 and 32 have the dimensions 1 in. ×1 in. ×24¼ in., and 1¼ in. ×1¼ in. ×25 in. Sleeve 50 is 1¼ in. ×1¼ in. ×2 in., and comprises 16 gauge galvanized steel square tube. Clamp 16 is about 2½" long, and has a rectangular cut-out portion measuring ¾ in. ×¾ in. ×3/32 in. The apertures on the frame modules are spaced with their centers 1 inch apart.

The cable 26 of the embodiment depicted above is standard ¼" 6×19 EIPS WRC steel. The type and strength of the cable and nets can be changed based upon requirements for fall protection and depending upon the size and weight of objects being conveyed.

A significant feature of the present invention is the ability to install the safety guard assembly on a wide variety of conveyors by appropriately selecting a combination of standard-sized support arm members and support strut members and attaching them in a configuration suitable for a particular conveyor. The width of the support arm, and the horizontal distance from the conveyor to each support strut can be adjusted, as well as the height of the support struts and the relative position of the support arm and each support strut. Furthermore, the type of netting can be changed.

Numerous modifications, adaptations and alternatives to the illustrated preferred embodiment may occur to one skilled in the art without departing from the spirit and scope of the invention. For example, a U-shaped frame module may be obtained by attaching the support arm to the lower ends of the support struts. An L-shaped or T-shaped frame module can be obtained by removing the support strut on one side and attaching the corresponding end of the support arm to a wall. In place of clamps 14, alternative means can be used to fasten the frames modules to the conveyor. Furthermore, the frame modules can be mounted to the wall, ceiling, floor, or to another support structure which is separate from the conveyor. The net can be mounted across and along the lower ends of the support struts only, i.e. without side guards on the sides only, or on one side and the bottom. The frame modules can be made of any suitable material, and the components disclosed in the preferred embodiment can be attached to each other by any suitable means. In place of cables 24, support beams can be run along the lenth of the conveyor to support the net. It is noted that the foregoing description and examples should not be deemed limitations of the invention.

What is claimed is:

1. A conveyor guard having an adjustable support system, comprising:
    a plurality of frame modules, each comprising:
        a support arm comprising at least two longitudinally positioned, slidably intersecting members,
        first fastener means for adjustably fixing the length of the support arm;
        at least one support strut comprising at least two longitudinally positioned, slidably intersecting members;
        second fastener means for adjustably fixing the length of the at least one support strut; and
        first mounting means for mounting the at least one support strut to the support arm so that the at least one strut is disposed in substantially perpendicular relationship to the support arm; and
    second mounting means for mounting the frame modules adjacent a conveyor.

2. The support system according to claim 1, wherein the first mounting means comprises means for independently adjusting the position of each of the at least one support struts relative to the support arm.

3. The support system according to claim 1, wherein the second mounting means comprises means for independently adjusting the effective spacing of each of the at least one support struts from the conveyor.

4. The support system according to claim 1, further comprising a first cable suspended between support struts of at least two frame modules.

5. The support system according to claim 4, further comprising a second cable suspended between support struts of at least two frame modules, wherein each support strut has an upper end and a lower end, the first cable is suspended from the upper end of the support strut of two frame modules, and the second cable is suspended from the lower end of the support strut of two frame modules.

6. The support system according to claim 1, wherein the first mounting means is fixed to the end of the support arm and a support strut is slidably adjustable relative to the mounting means.

7. The support system according to claim 6, wherein the first mounting means comprises a sleeve dimensioned to closely and slidably receive the support strut.

8. The support system according to claim 1, wherein the support arms and the support struts each comprise slidably intersecting elongated tubular members having two pairs of opposed sides, the opposed sides comprising means defining pairs of aligned apertures, and the means for adjusting the lengths of the support arms and the support struts comprise bolts receivable in the apertures.

9. The support system according to claim 1, wherein the conveyor has parallel side rails and the second mounting means comprises clamp assemblies for mounting at least some of the frame members to the side rails.

10. The support system according to claim 1, wherein at least one frame module has two support struts and is H-shaped.

11. A conveyor guard having an adjustable support system, comprising:
    a plurality of frame modules, each comprising:
        a support arm comprising at least two longitudinally positioned, slidably intersecting members;
        first fastener means for adjustably fixing the length of the support arm;
        at least one support strut comprising at least two longitudinally positioned, slidably intersecting members;
        second fastener means for adjustably fixing the length of the at least one support strut; and
        first mounting means for independently mounting and adjustably positioning each of the at least one support struts to the support arm in substantially perpendicular relationship thereto;

second mounting means for mounting the frame members to a conveyor; and third fastener means for independently adjusting the effective spacing of each of the at least one support struts from the conveyor.

12. The support system according to claim 11, further comprising a first cable suspended between support struts of at least two frame modules.

13. The support system according to claim 12, further comprising a second cable suspended between support struts of at least two frame modules, wherein each support strut has an upper end and a lower end, the first cable is suspended from the upper end of support struts of the at least two frame modules, and the second cable is suspended from the lower end of support struts of the at least two frame modules.

14. The support system according to claim 11, wherein the first mounting means is fixed to the ends of a support arm and the support strut is slidably positionable relative to the mounting means.

15. The support system according to claim 14, wherein the first mounting means comprises a sleeve dimensioned to closely and slidably receive the support strut.

16. The support system according to claim 11, wherein the support arm and the at least one support strut each comprise slidably intersecting elongated tubular members having two pairs of opposed sides, the opposed sides comprising means defining pairs of aligned apertures, and the first and second fastening means comprise bolts receivable in the apertures.

17. The support system according to claim 11, wherein the conveyor has parallel side rails and at least some of the frame members are attached to the side rails by the second mounting means.

18. The support system according to claim 13, wherein at least one frame module has two support struts and is substantially H-shaped.

19. An adjustable conveyor guard system, comprising:

a conveyor defining a transport path;

a plurality of frame modules, each comprising:
a support arm comprising at least two longitudinally positioned, slidably intersecting members;
first fastener means for adjustably fixing the length of the support arm;
at least one support strut comprising at least two longitudinally positioned, slidably intersecting members;
second fastener means for adjustably fixing the length of the support strut; and
first mounting means for mounting each of the at least one support struts to the support arm;

second mounting means for mounting the frame members adjacent the conveyor so that the support struts are disposed in generally parallel upright relationship;

first and second cables suspended between the support struts of at least two frame modules; and a net attached to the first and second cables and extending along the transport path of the conveyor.

20. The conveyor guard system according to claim 19, wherein the third fastener means comprises means for independently adjusting the position of each of the at least one support struts relative to the support arm.

21. The conveyor guard system according to claim 19, wherein the second mounting means comprises means for independently adjusting the effective spacing from the conveyor of each of the at least one support struts.

22. The conveyor guard system according to claim 19, wherein the first mounting means is fixed to the support arm and is slidably adjustable relative to the support strut.

23. The conveyor guard system of claim 19, wherein the path has a Y-shaped branch.

24. A safety system for a conveyor comprising:

a conveyor defining a transport path, the conveyor having parallel side rails;

a plurality of frame modules, each comprising:
a support arm comprising at least two longitudinally positioned, slidably intersecting members;
first fastener means for adjustably fixing the length of the support arm;
at least one support strut comprising at least two longitudinally positioned, slidably intersecting members;
second fastener means for adjustably fixing the length of the support strut; and
third fastener means for fastening each of the at least one support struts to the support arm;

mounting means for mounting the frame members to the side rails of the conveyor;

at least first and second cables suspended between the support struts of at least two frame modules; and at least one net attached to the cables and extending along the path of the conveyor.

* * * * *